United States Patent
Harada et al.

(10) Patent No.: US 9,701,815 B2
(45) Date of Patent: Jul. 11, 2017

(54) RESIN COMPOSITION, PREPREG USING THE SAME, AND FIBER-REINFORCED COMPOSITE MATERIAL

(75) Inventors: Yukihiro Harada, Aichi (JP); Manabu Kaneko, Aichi (JP); Tomoo Sano, Aichi (JP); Kazutami Mitani, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/812,422

(22) PCT Filed: Jul. 26, 2011

(86) PCT No.: PCT/JP2011/066922
§ 371 (c)(1),
(2), (4) Date: Jan. 25, 2013

(87) PCT Pub. No.: WO2012/014871
PCT Pub. Date: Feb. 2, 2012

(65) Prior Publication Data
US 2013/0122768 A1   May 16, 2013

(30) Foreign Application Priority Data

Jul. 26, 2010   (JP) ................. 2010-167616

(51) Int. Cl.
*C08K 5/3415* (2006.01)
*C08K 5/13* (2006.01)
(Continued)

(52) U.S. Cl.
CPC .......... *C08K 5/3415* (2013.01); *C08F 222/26* (2013.01); *C08F 222/40* (2013.01);
(Continued)

(58) Field of Classification Search
CPC ..... C08F 263/00; C08F 263/06; C08F 263/08; C08F 216/00; C08F 216/12; C08F 216/14;
(Continued)

(56) References Cited

U.S. PATENT DOCUMENTS 4,131,632 A * 12/1978 Suzuki et al. ............... 525/496
4,393,177 A *  7/1983 Ishii et al. .................... 525/422
(Continued)

FOREIGN PATENT DOCUMENTS

CN    101120027 A    2/2008
JP    61-252233      11/1986
(Continued)

OTHER PUBLICATIONS

Office Action issued in counterpart Chinese Patent Application No. 201180036475.0 dated Feb. 18, 2014.
(Continued)

*Primary Examiner* — Camie Thompson
(74) *Attorney, Agent, or Firm* — Morgan, Lewis & Bockius LLP

(57) ABSTRACT

A resin composition that has good heat resistance and handleability and that can produce a prepreg which has a good balance between tackyness and drapability and which causes little resin flow during prepreg molding, a prepreg that is manufactured using the resin composition, and a fiber-reinforced composite are provided. A resin composition that contains a maleimide compound, diallyl bisphenol A, and a diallyl isophthalate polymer, a prepreg in which reinforcing fibers are impregnated with the resin composition, and a fiber-reinforced composite material that is obtained by molding the prepreg are provided.

13 Claims, 3 Drawing Sheets

(51) Int. Cl.
  *C08L 47/00* (2006.01)
  *C08F 222/40* (2006.01)
  *C08J 5/24* (2006.01)
  *C08F 222/26* (2006.01)
  *C08F 267/06* (2006.01)

(52) U.S. Cl.
  CPC .............. *C08F 267/06* (2013.01); *C08J 5/24* (2013.01); *C08K 5/13* (2013.01); *C08L 47/00* (2013.01); *C08J 2367/06* (2013.01); *Y10T 442/20* (2015.04); *Y10T 442/2984* (2015.04)

(58) Field of Classification Search
  CPC .... C08F 222/00; C08F 222/36; C08F 222/40; C08F 290/00; C08F 290/02; C08F 290/06; C08F 222/20; C08F 222/026; C08F 267/40; C08J 5/00; C08J 5/04; C08J 5/06; C08J 5/08; C08J 5/24; C08J 2367/06; C08K 5/3415; C08L 47/00; Y10T 442/20; Y10T 442/2984
  USPC ..................................... 442/59, 179; 524/104
  See application file for complete search history.

(56) References Cited

U.S. PATENT DOCUMENTS

| | | | | |
|---|---|---|---|---|
| 4,752,641 A | * | 6/1988 | Koyama et al. | .............. 526/261 |
| 5,047,455 A | * | 9/1991 | Hesse et al. | .................. 523/508 |

FOREIGN PATENT DOCUMENTS

| | | | |
|---|---|---|---|
| JP | 62-288619 | * | 12/1987 |
| JP | 01-156367 | | 6/1989 |
| JP | 02-113006 | | 4/1990 |
| JP | 06-002274 | | 1/1994 |
| JP | 09-176246 | * | 7/1997 |
| JP | 2003-246872 | | 9/2003 |
| JP | 2009-263624 | | 11/2009 |
| JP | 2011-162631 | | 8/2011 |
| WO | 2006/088612 A1 | | 8/2006 |

OTHER PUBLICATIONS

Extended European Search Report issued in counterpart European Patent Application No. 11812460.1 dated May 6, 2015.

* cited by examiner

RESIN COMPOSITION, PREPREG USING THE SAME, AND FIBER-REINFORCED COMPOSITE MATERIAL

TECHNICAL FIELD

The present invention relates to a resin composition, a prepreg that uses this resin composition, and a fiber-reinforced composite material.

BACKGROUND ART

As matrix resins that are used in fiber-reinforced composite materials, epoxy resins are the mainstream resins. However, in some cases, epoxy resins have poor heat resistance, and have not been able to sufficiently satisfy heat resistance requirement in a high temperature environment of, for example, more than 180° C. In addition, polyimides that are known as heat-resistant resins have excellent heat resistance, but in some cases, it has been very difficult to manufacture a prepreg by melt impregnation that uses polyimides, and the manufactured prepreg has had neither tackyness nor drapability at all in some cases. Therefore, maleimide compounds that have good heat resistance and that provide manufactured prepregs that have a good balance between tackyness and drapability are noted as matrix resins for fiber-reinforced composite materials (Patent Literatures 1 and 2).

In addition, Patent Literature 3 describes a resin composition that contains a maleimide compound, an allyl compound, and a diallyl isophthalate polymer.

CITATION LIST

Patent Literature

Patent Literature 1: JP9-176246A
Patent Literature 2: JP2009-263624A
Patent Literature 3: JP61-252233A

SUMMARY OF INVENTION

Technical Problem

Generally, the curing reaction of a resin composition that contains a maleimide compound, as the main component, is mild and occurs at high temperature. Therefore, in some cases, a large amount of the resin flows out when a prepreg that was obtained by impregnating reinforcing fibers with the resin composition is molded. Hereinafter, this phenomenon is referred to as "a resin flow." In some cases, a large amount of resin flow has adversely affected performance and the appearance of the fiber-reinforced composite material and the like.

Methods for preventing a resin flow broadly include two types of methods. The first method is a method of preventing a resin flow by a bagging configuration during prepreg molding. In order to perform bagging which will not cause a serious resin flow, however, a lot of work may be required, the molding cost may be high, and it may be difficult to make a molded material that has a complicated shape.

The second method is a method of improving the resin composition so that a resin flow can be prevented. Examples of the method include the increase of the curing reaction rate by adding a curing reaction accelerator, the increase of the lowest viscosity of the resin composition by adding a high molecular weight compound such as a thermoplastic resin, and the provision of thixotropy by adding a thixotropic agent.

However, in some cases, the toughness of resin cured products decreases dramatically, when a sufficient amount of a thixotropic agent (for example, silica fine particles) is added to a resin composition that contains maleimide as the main component in order to prevent a resin flow. As well, in some cases, good heat resistance of maleimide resins is greatly and adversely affected, when a general thermoplastic resin is added. The method of adding a curing accelerator is used in Patent Literatures 1 and 2, but has been insufficient to prevent a resin flow in some cases. As well, in some cases, using a large amount of curing accelerators which have a high acceleration effect in order to obtain the effect of preventing the flow of resin may decrease the storage stability of the resin composition and the prepreg, and may start a curing reaction in the preparation process of the resin composition.

Patent Literature 3 is an invention in which a maleimide resin is added to a diallyl phthalate prepolymer as the main component. In this invention, the maleimide resin is added in order to improve the impact resistance and dimensional stability of the diallyl phthalate resin as the main component, and the object of this invention is different from that of the present invention.

It is an object of the present invention to provide a resin composition that has good heat resistance and handleability and that can be used to produce a prepreg which has a good balance between tackyness and drapability and which causes a small resin flow during prepreg molding. It is another object of the present invention to provide a prepreg that is manufactured by using the resin composition, and it is also another object of the present invention to provide a fiber-reinforced composite material thereof.

Solution to Problem

The present invention is a resin composition that contains a maleimide compound, diallyl bisphenol A, and a diallyl isophthalate polymer.

It is preferable that the resin composition of the present invention be a blend in which the following formulas are satisfied when amounts of an aromatic maleimide compound, an aliphatic maleimide compound, diallyl bisphenol A and diallyl isophthalate polymer are represented by [a1], [a2], [b] and [c], respectively, in parts by mass:

$$[a1]+[a2]=100 \tag{1}$$

$$[b] \geq 20 \tag{2}$$

$$[b] \leq -1.4 \times [a2]+140 \tag{3}$$

$$[b] \geq -3.6 \times [a2]+90 \tag{4}$$

$$15 \leq [c] \leq 65 \tag{5}$$

$$0 \leq [a2] \leq 45 \tag{6}$$

As well, it is preferable that the resin composition of the present invention be a blend in which the following formulas are satisfied when the amounts of the aromatic maleimide compound, the aliphatic maleimide compound, diallyl bisphenol A and diallyl isophthalate polymer are represented by [a1], [a2], [b] and [c], respectively, in parts by mass:

$$[a1]+[a2]=100 \tag{7}$$

$$40 \leq [b] \leq 80 \tag{8}$$

$15 \leq [a2] \leq 40$            (9)

$20 \leq [c] \leq 60$            (10).

In addition, it is preferable that these resin compositions contain peroxide.

In addition, the present invention is a prepreg that is obtained by impregnating reinforcing fibers with the above-described resin composition, and further, the present invention is a fiber-reinforced composite material that is obtained by molding this prepreg. In addition, it is preferable that the above reinforcing fibers be carbon fibers.

Advantageous Effects of Invention

The present invention provides a resin composition that has good heat resistance and handleability, and that produces a prepreg which has a good balance between tackyness and drapability and which causes a small resin flow during prepreg molding. The present invention also provides a prepreg that is manufactured using the resin composition and a fiber-reinforced composite material.

DESCRIPTION OF EMBODIMENTS

Figure 1:
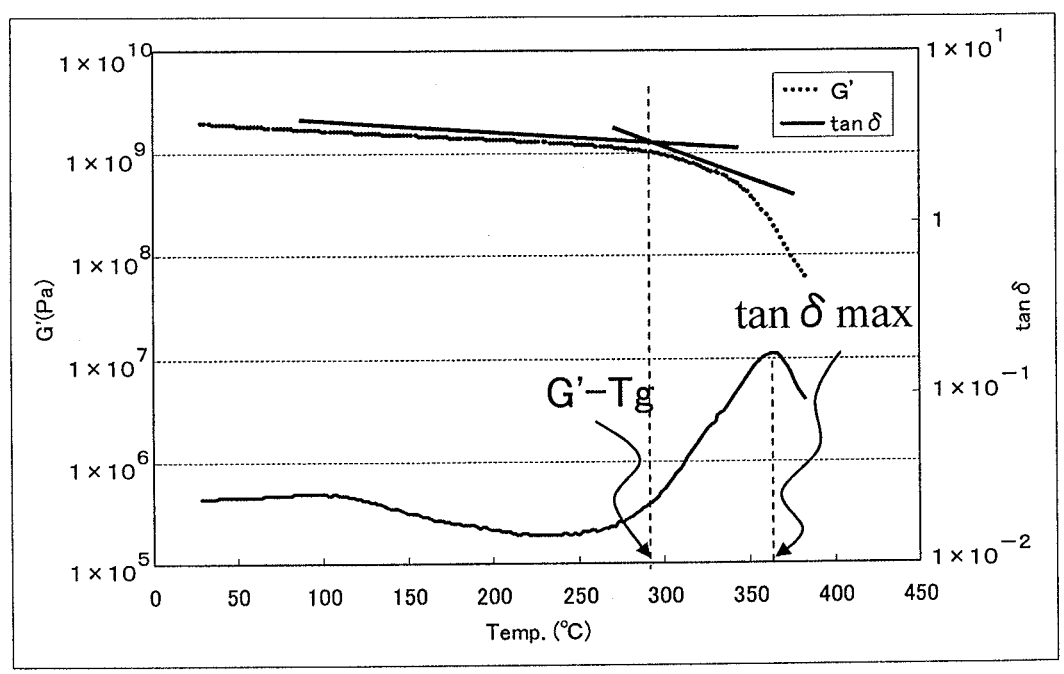
FIG. 1 is a graph for explaining a plotting method for obtaining G'-Tg and tan δ max.

The fiber-reinforced composite material of the present invention can be preferably used for materials in aerospace applications, industrial applications and the like, for which high heat resistance is required.

Preferable embodiments of the present invention will be described below. It should be understood that the present invention is not limited only to these modes, and various modifications can be made within the spirit and scope of practice of the present invention.

It is preferable that the resin composition of the present invention contain a maleimide compound, diallyl bisphenol A, and a diallyl isophthalate polymer, as essential components, and further contain peroxide. Hereinafter, the maleimide compound, diallyl bisphenol A, the diallyl isophthalate polymer and the peroxide are sometimes referred to as component (a), component (b), component (c) and component (d), respectively.

<Component (a)>

Component (a) i.e. the maleimide compound should be a compound that has a maleimide group. An aromatic maleimide compound and an aliphatic maleimide compound can be preferably used. Hereinafter, the aromatic maleimide compound and the aliphatic maleimide compound are occasionally referred to as component (a1) and component (a2), respectively. Component (a1) alone, component (a2) alone, or both component (a1) and component (a2) together may be used as component (a). In addition, component (a) can be composed of only component (a1) or only component (a2), and can also be composed of component (a1) and component (a2). For each of component (a1) and component (a2), one compound may be used alone, or two or more compounds may be mixed and used.

Component (a) (for example, component (a1) and component (a2)) may be a monofunctional maleimide compound that has one maleimide group, or a polyfunctional maleimide compound that has two or more maleimide groups. However, from the viewpoint of providing good heat resistance, component (a) is preferably a polyfunctional maleimide compound, and it is desired that the above polyfunctional maleimide compound be included as the main component in component (a). Specifically, the content of the polyfunctional maleimide compound in component (a) is desirably 55% or more by mass and 100% or less by mass. In addition, the content of component (a) in the resin composition is preferably 33.3% or more by mass from the viewpoint of providing good heat resistance, and is preferably 74.1% or less by mass from the viewpoint of improving handleability of the resin composition and drapability and tackyness of the prepreg that is manufactured by using the resin composition, and from the viewpoint of preventing a resin flow.

<Component (a1)>

Preferable examples of component (a1) i.e. the aromatic maleimide compound are shown below: N,N'-m-phenylenedimaleimide, N,N'-p-phenylenedimaleimide, 4,4'-bismaleimidodiphenylether, bisphenol A diphenyl ether bismaleimide, 3,3'-dimethyl-5,5'-diethyl-4,4'-bismaleimidodiphenylmethane, 4-methyl-1,3-phenylenedimaleimide, 2,2-bis-[4-(4-maleimidophenoxy)phenyl]propane, N,N'-2,4-tolylenedimaleimide, N,N'-2,6-tolylenedimaleimide, aromatic maleimide compounds represented by the following formula I, and the like. The "n" in formula I represents an integer of 0 or more. One of these compounds may be used alone, or two or more of these compounds may be mixed and used.

[Formula 1]

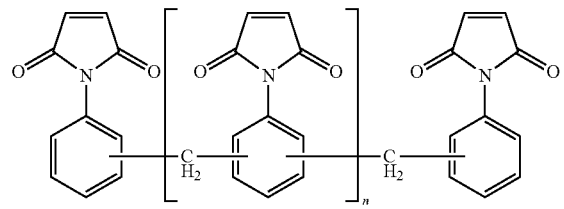

(I)

In particular, among these, a mixture of aromatic maleimide compounds that are represented by formula I in which "n" is 0.3 to 0.4 on average is preferably used. For example, a mixture of aromatic maleimide compounds that are represented by formula I in which "n" is 0.35 on average is a mixture of an aromatic maleimide compound in which "n" in formula I is 0 and an aromatic maleimide compound in which "n" is 1 or more (for example, "n" is 1, 2, or the like).

In particular, the above mixture in which "n" is 0.3 to 0.4 on average has a low melting point, and the dissolving temperature of the mixture in a liquid component such as an allyl compound (for example, diallyl bisphenol A), during preparation of the resin composition is also low, compared with the dissolving temperature of general maleimide compounds. In addition, this mixture has low crystallizability compared with general aromatic maleimide compounds, and has properties in which its crystals do not easily precipitate in the resin composition.

The aromatic maleimide compound in which "n" in formula I is 0 include 4,4'-bismaleimidodiphenylmethane, which has high crystallinity and a very high melting point, i.e. 150° C. or more.

On the other hand, the above mixture in which "n" is 0.3 to 0.4 on average is a mixture that is composed of an aromatic maleimide compound in which "n" is 0 and an aromatic maleimide compound in which "n" is 1, 2 or more, and therefore, the crystallinity of the mixture decreases, and the melting point of its crystal is also lower by 30° C. or more compared with that of 4,4'-bismaleimidodiphenylmethane. Therefore, compared with general aromatic maleimide compounds such as 4,4'-bismaleimidodiphenylmethane that has high crystallinity, the mixture of the above resin composition can easily prevent the crystal of the aromatic maleimide compounds from precipitating in the resin composition during preparation of the resin composition, and the mixture can easily prevent a cause of a decrease in the physical properties of the composite materials from occurring, or can easily prevent obstacles from occurring during formation of a prepreg.

When "n" is 0.3 or more on average, the melting point of the crystals and the dissolving temperature of the aromatic maleimide compounds during the preparation of the resin composition are low compared with those of the aromatic maleimide compound in which "n" is 0. As well, it is expected that a mixture in which "n" is larger than 0.4 on average also has effects similar to those of the above mixture in which "n" is 0.3 to 0.4. However, it is difficult to obtain industrially available aromatic maleimide compounds in which "n" is larger than 0.4 on average. Therefore, "n" is determined to be 0.4 or less.

<Component (a2)>

Component (a2) i.e. the aliphatic maleimide compound desirably has two or more maleimide groups as described above, and further, is desirably a compound in which a main chain that links these plural maleimide groups is mainly composed of a hydrocarbon. In addition, the aliphatic maleimide compound may contain a functional group such as an ether group or a sulfide group in the molecular structure (for example, in the main chain). In addition, the main chain may be composed of only a straight chain, or may contain a branched chain further. One aliphatic maleimide compound may be used alone, or two or more aliphatic maleimide compounds may be mixed and used.

As specific component (a2), 1,6-dimaleimido-(2,2,4-trimethyl)hexane is preferable for industrial uses.

<Component (b)>

The structure of component (b) i.e. diallyl bisphenol A is shown in the following formula II. Diallyl bisphenol A has two or more allyl groups and is liquid in a room temperature environment. By using this allyl compound as component (b), the preparation of the resin composition becomes easy. In addition, the viscosity of the resin composition can be lowered to improve handleability, and further, good toughness can be provided to the resin composition.

[Formula 2]

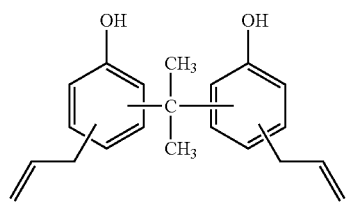

(II)

<Component (c)>

By blending component (c) i.e. the diallyl isophthalate polymer into the resin composition to increase the lowest viscosity of the resin composition, a resin flow during prepreg molding can be prevented.

The diallyl isophthalate polymer that can be preferably used in the invention of this application preferably has a weight average molecular weight of 30000 or more and 50000 or less in terms of standard polystyrene equivalent. The weight average molecular weight of 30000 to 50000 (in terms of standard polystyrene equivalent) is preferable because the resin flow is easily prevented when the resin composition is cured at high temperature, and because the softening point is not too a high temperature. In addition, the weight average molecular weight of the diallyl isophthalate polymer can be measured using GPC (gel permeation chromatography).

<Effects Obtained by Use of Both Component (a1) and Component (a2)>

In the present invention, as component (a), only component (a1) or only component (a2) may be used, or component (a1) and component (a2) may be used in combination. However, both components are preferably used in combination for the following reason.

When component (a1) is solely used as component (a), good heat resistance can be obtained, but compared with a case where both components are used in combination, the viscosity of the resin composition is high, and the tackyness and drapability of a prepreg that is obtained by impregnating reinforcing fibers with the resin composition are low. These tendencies can be improved by blending a somewhat large amount of component (b) into the resin composition. But, there is a tendency in which the higher the mass ratio of component (b) results in the lower heat resistance of the resin composition.

On the other hand, when component (a1) and component (a2) are used together, moderate viscosity can be easily obtained without blending a large amount of component (b), and a resin composition with good handleability can be easily obtained regardless of the type and composition of component (a1). In addition, compared with a case where component (a1) is used alone, there is no need to blend a large amount of component (b), and therefore, good heat resistance that component (a1) has can be easily maintained.

When component (a2) is solely used as component (a), the viscosity of the resin composition is low compared with a case where component (a1) is solely used, and a resin composition that has good handleability can be obtained, but the heat resistance of the resin composition tends to be poor. Therefore, in the present invention, it is desirable to use component (a1).

In the present invention, by setting the amounts of component (a1), component (a2), component (b) and component (c), within the ranges of formulas (1) to (6), a resin composition that has good handleability and good heat resistance can be easily obtained. The amounts of component (a1), component (a2), component (b) and component (c) are represented by [a1], [a2], [b] and [c], respectively, in parts by mass. In addition, the unit in the following formulas (formulas (1) to (10)) is parts by mass.

$$[a1]+[a2]=100 \tag{1}$$

$$[b] \geq 20 \tag{2}$$

$$[b] \leq -1.4 \times [a2]+140 \tag{3}$$

$$[b] \geq -3.6 \times [a2]+90 \tag{4}$$

$$15 \leq [c] \leq 65 \quad (5)$$

$$0 \leq [a2] \leq 45 \quad (6).$$

As well, in the present invention, by setting the amounts of component (a1), component (a2), component (b) and component (c) within the ranges of formulas (7) to (10), a resin composition that has good handleability and good heat resistance can be easily obtained.

$$[a1]+[a2]=100 \quad (7)$$

$$40 \leq [b] \leq 80 \quad (8)$$

$$15 \leq [a2] \leq 40 \quad (9)$$

$$20 \leq [c] \leq 60 \quad (10).$$

<Formulas (1) to (6)>

By setting the amounts of the component (a1), component (a2), component (b) and component (c) within the ranges of the formulas (1) to (6), a resin composition that has good heat resistance and good handleability can be easily obtained. In addition, a prepreg that is obtained by impregnating reinforcing fibers with the resin composition, can easily have good tackyness and drapability, and further, a sufficient resin flow prevention effect is easily obtained.

By setting the blended amount (mass ratio) of component (c) that is contained in the resin composition equal to or more than the amount of the lower limit of formula (5) (i.e. 15 parts by mass), a sufficient resin flow prevention effect can be easily obtained. In addition, by setting the blended amount of component (c) in the resin composition equal to or less than the amount of the upper limit of formula (5) (i.e. 65 parts by mass), a reduction in handleability can be easily prevented, and impairment of good heat resistance that component (a1) has can be easily prevented.

<Formulas (7) to (10)>

By setting the blended amounts of component (a1), component (a2), component (b) and component (c) within the ranges of the formulas (7) to (10), the effects that are described in the above section of <Formulas (1) to (6)> can be made better. Further, the obtained resin composition can easily have cured resin physical properties such as heat resistance, elastic modulus and toughness, with a good balance.

As well, by setting the mass ratio of component (c) within the range of formula (10) based on 100 parts by mass of component (a), a sufficient resin flow effect can be easily obtained, and better heat resistance can be easily provided.

<Component (d)>

The resin composition of the present invention preferably contains component (d) i.e. peroxide. By blending component (d), the curing reaction rate of the resin composition can be easily increased, and a resin flow during molding of the prepreg for which the resin composition is used can be easily prevented. However, when component (d) is added without adding component (c) to the resin composition, the prevention of a resin flow is insufficient. By using component (c) and component (d) in combination, an excellent resin flow prevention effect can be obtained. The mass ratio of component (d) based on 100 parts by mass of component (a) is preferably 0.05 to 2.00 parts by mass. When the amount of component (d) that is blended in the resin composition is within this range, good physical properties of the resin composition can be easily maintained.

<Other Components>

It is preferable that the resin composition of the present invention contain components (a) to (c), and further it is preferable that it contain component (d). The resin composition of the present invention may contain publicly known components other than these components, for example, a curing agent, a curing aid, a thermosetting resin, a thixotropic agent, a filler, a stabilizer, a flame retardant, and a pigment, as required, in a range that does not impair the effects of the present invention.

<Method for Preparing Resin Composition>

Method for Preparing Resin Composition Containing Components (a) to (c)

This resin composition can be obtained by mixing components (a) to (c) into a uniform state, specifically by heating, melting and dissolving, and stirring components (a) to (c). When component (a), component (b) and component (c), as raw materials, are melted and dissolved, it is preferable to set the melting and dissolving temperature from 70° C. to 150° C. because the curing reaction tends to proceed quickly at high temperature. Further, it is more preferable to set the melting and dissolving temperature from 90° C. to 130° C. In addition, the time for the process is preferably 10 minutes or more and 6 hours or less excluding the time required for the temperature to rise and fall.

Here, when component (c) is blended into the resin composition, it is desirable that the raw materials including component (c) be previously kneaded at room temperature before being heated, or that component (c) be added and dissolved in small amounts in a molten mixture of component (a) and component (b). Performing this operation can easily prevent component (c) from being fused together and prevent mixing them into a uniform state from becoming difficult.

Method for Preparing Resin Composition Containing Components (a) to (d)

When component (d) is blended into the resin composition, it is preferable that component (d) be added after components (a) to (c) are mixed into a uniform state. It is preferable that component (d) be dissolved in part of component (b) that is to be used, then that these components be added to the resin composition. This procedure ensures that raw materials can be easily and uniformly mixed. When component (d) is previously dissolved in part of component (b) that is to be used, 2 to 70 parts by mass of component (d) are preferably blended based on 100 parts by mass of component (b). In addition, if component (d) is added at a temperature of 80° C. or more, the curing reaction tends to proceed quickly, and therefore, the temperature of the raw materials in which components (a) to (c) are uniformly mixed is desirably less than 80° C. when component (d) is added.

The prepreg of the present invention is obtained by impregnating reinforcing fibers with the resin composition of the present invention. Examples of the reinforcing fibers include carbon fibers, graphite fibers, aramid fibers and glass fibers. Among them, in particular, carbon fibers are preferably used for a prepreg because they can exhibit high specific strength and a high specific elastic modulus.

The method for impregnating a carbon fiber woven fabric with the resin composition is not particularly limited, but it is preferable to use methods in which a solvent is not used. Without solvent for the impregnation, the occurrence of voids due to the influence of a residual solvent can be easily prevented when a fiber-reinforced composite material is produced, and a decrease in quality and physical properties of the fiber-reinforced composite material can be easily prevented. Examples of preferable impregnation methods include a hot melt method in which the resin composition of the present invention is heated up to 60° C. to 130° C., and in which reinforcing fibers are impregnated with the resin composition.

The fiber-reinforced composite material of the present invention can be made by molding the prepreg of the present invention, more specifically by laminating the prepreg and then heat-curing the laminate while applying pressure to the laminate. Examples of the method for applying heat and pressure include a press molding method, an autoclave molding method, a wrapping tape method and an internal pressure molding method.

EXAMPLES

The present invention will be further described below by Examples and Comparative Examples.

Examples 1 to 39 and Comparative Examples 1 to 16

The raw materials for the resin compositions that are used in Examples, and preparation methods of the resin compositions, methods for manufacturing prepregs using the resin compositions, methods for manufacturing fiber-reinforced composite materials, and methods for measuring physical properties are shown below. Prepregs and fiber-reinforced composite materials are manufactured only in Examples 1, 3 and 4, and Comparative Examples 1 and 2.

The composition of the resin compositions and the measurement results of the physical properties are collectively shown in Tables 1 to 5. The numerical values of components in these Tables represent the numbers of parts by mass. The scope of the present invention is not limited to these Examples.

<Raw Materials>

In the examples, following commercial products were used as raw materials for the resin compositions.

<Component (a1)>

Phenylmethanemaleimide oligomer (n=0.35) (trade name: BMI-2300, Daiwa Kasei Co., Ltd.)

4,4'-Bismaleimidodiphenylmethane (trade name: BMI (referred to as BMI-H), K.I Chemical Industry Co., Ltd.)

2,2-Bis-[4-(4-maleimidophenoxy)phenyl]propane (trade name: BMI-80, K.I Chemical Industry Co., Ltd.).

<Component (a2)>

1,6-Bismaleimido-2,2,4-trimethylhexane (trade name: BMI-TMH, Daiwa Kasei Co., Ltd.).

<Eutectic Mixture of Component (a1) and Component (a2)>

A eutectic mixture of aromatic maleimide compounds and an aliphatic maleimide compound (trade name: Compimide353, aromatic maleimide compounds: bismaleinimidodiphenylmethane and m-tolylenedimaleimide, aliphatic maleimide compound: 1,6-bismaleinimido-2,2,4-trimethylhexane, blending mass ratio (a1/a2): 85/15, Evonik Degussa Japan Co., Ltd.).

≤Component (b)>

Diallyl bisphenol A (trade name: BPA-CA, Mitsui Fine Chemicals, Inc.)

Diallyl bisphenol A (trade name: Matrimide5292B, Huntsman Corporation).

≤Component (c)>

A diallyl isophthalate polymer (trade name: DAISO ISO DAP, DAISO CO., LTD.).

≤Component (d)>

Dicumyl peroxide (trade name: PERCUMYL D, NOF CORPORATION).

≤Other Components>

Isophthalic acid (trade name: DAISO ISO DAP 100 Monomer, DAISO CO., LTD.).

≤Preparation of Resin Compositions that do not Contain Component (D)>

Component (a), component (b), and component (c) as raw materials, were weighed into a flask, and heated and stirred at 150° C. or less to obtain a resin composition. In order to obtain the resin composition, these raw materials were previously kneaded at room temperature (40° C. or less) before being heated, or component (c) was added in small amounts to the molten mixture of component (a) and component (b).

≤Preparation of Resin Compositions Containing Component (d)>

Component (d) was previously dissolved in part of component (b). Then, component (a), the remaining component (b) and component (c), as raw materials, were weighed into a flask, and heated and stirred at 150° C. or less to mix these raw materials into a uniform state. Prior to performing this operation, components (a) to (c) had been previously kneaded at room temperature before being heated, or component (c) had been added and dissolved in small amounts in a molten mixture of component (a) and component (b). The raw materials that were melted, dissolved and stirred were allowed to cool to about 70° C. or less, and then, component (d) that was previously dissolved in part of component (b) was added, and the raw materials were sufficiently heated and stirred to obtain a resin composition.

≤Fabrication of Prepreg>

A prepreg was obtained by impregnating aligned carbon fibers with the obtained resin composition. For the carbon fibers, carbon fiber PYROFIL TR50S 15L (trade name) manufactured by MITSUBISHI RAYON CO., LTD. was used. The carbon fiber basis weight of the prepreg was 150 g/m², and the resin content was 33% by mass.

≤Fabrication of Fiber-Reinforced Composite Material>

The obtained prepreg was cut into sheets each having a size of 200 mm×200 mm, and they were laminated by a hand lay-up method. The laminate was subjected to primary curing in an autoclave and secondary curing in an oven. The curing conditions were as follows:

Primary curing: conducted at 180° C. for 6 hours.
Secondary curing: conducted at 243° C. for 6 hours.

On that occasion, the prepreg and the fiber-reinforced composite material were manufactured without carrying out a bagging operation to prevent resin flow. Here, a bagging operation which prevents resin flow refers to a bagging configuration in which the periphery of the prepreg laminate is covered with an auxilliary material without an opening in the periphery so that the resin does not flow out from the laminate during curing.

≤Evaluation>

Cured resin plates were manufactured from the above resin compositions according to the following method. Then, using the cured resin plates, a three-point bending test, and the measurement of glass transition temperature and tan δ max were performed.

Fabrication of Cured Resin Plate

The prepared resin composition was cast using two glass plates with a 2 mm spacer between them, and held at 180° C. for 6 hours for primary curing. Further, the glass plates and the spacer were removed, and the resin composition was held at 243° C. for 6 hours for secondary curing to make a cured resin plate. The rate of temperature increase from room temperature (23° C.) to a holding temperature was 1.7° C./min during both the primary curing and the secondary curing.

1. Three-Point Bending Test of Cured Resin Products
[Bending Test Conditions]
Apparatus: Instron model 4465 (manufactured by Instron Corporation)
Crosshead speed: 2.0 mm/min
Span/thickness ratio: 16
Sample size: 60 mm long, 7 mm wide, and 2 mm thick
[Measurement Environment]
Temperature: 23° C.
Humidity: 50% RH (relative humidity).
The strength, elastic modulus, and breaking elongation of the cured resin plates that were obtained by the bending test are shown in Tables 1 to 5.

2. Measurement of Glass Transition Temperature and tan δ Max

The glass transition temperature (G'-Tg) and tan δ max of the resin compositions were measured by a DMA method (dynamic viscoelasticity method) using the above cured resin plates. G'-Tg and tan δ max were obtained according to FIG. 1. The obtained values are shown in Tables 1 to 5. These values can be indicators of the heat resistance of the resin compositions and the fiber-reinforced composite materials.

A robot hand for conveying a glass substrate for a liquid crystal panel, that is one of the applications where the fiber-reinforced composite material of the present invention can be preferably used, is used in an environment of up to 250° C. Therefore, a G'-Tg of 270° C. or more and a tan δ max of 300° C. or more are preferable because the fiber-reinforced composite material can easily withstand use in this environment and has good heat resistance.
[Measurement Conditions]
Apparatus: the trade name ARES-RDA (manufactured by TA Instruments Corporation)
Rate of temperature increase: 5° C./min
Measurement frequency: 1 Hz
Strain: 0.5%
Measurement temperature range: about 30° C. to about 450° C.
Sample size: 55 mm long, 12.7 mm wide, and 2 mm thick.

3. Measurement of Viscosity of Resin Compositions as Temperature Increase

The viscosity of the resin compositions was measured under the following measurement conditions. Viscosity at 30° C., 45° C., and 60° C., the lowest viscosity, and temperature at the lowest viscosity for the resin compositions are shown in Tables 1 to 5. The viscosity measurement was performed from 30° C., or was performed from a temperature of more than 30° C. at which it was possible to measure the viscosity whereas it had not been possible to take a measurement at 30° C. The viscosity was measured as the temperature increased until the minimum value of the viscosity was obtained. On that occasion, the smallest resin viscosity (minimum value) that was measured in the measurement temperature range was referred to as the lowest viscosity. In addition, for resin compositions in which the viscosity could not be measured at 30° C., 45° C., or 60° C. because of too high viscosity, the expression "Impossible to measure" is described in Tables 1 to 5.
[Measurement Conditions]
Apparatus: the trade name AR-G2 (manufactured by TA Instruments Corporation)
Plate used: a 35 mm φ (diameter) parallel plate
Plate gap: 0.5 mm
Measurement frequency: 10 rad/sec
Stress: 300 to 500 N/m$^2$ (3000 to 5000 dynes/cm$^2$)
Rate of temperature increase: 2° C./min.

4. Confirmation of Resin Flow Prevention

A determination was made whether or not it will be possible to prevent resin flow during prepreg molding based on the following criteria:

○: The lowest viscosity of the resin composition is 0.08 Pa·s or more, and the resin flow prevention effect is excellent.

Δ: The lowest viscosity of the resin composition is 0.05 Pa·s or more and less than 0.08 Pa·s, and the resin flow prevention effect is moderate.

x: The lowest viscosity of the resin composition is less than 0.05 Pa·s, and the resin flow prevention effect is insufficient.

For Examples 1, 3 and 4, which were judged as "○" based on the above evaluation criteria, and Comparative Examples 1 and 2 which were judged as "x", prepregs that were manufactured using the obtained resin compositions were actually molded so as to confirm the resin flow prevention effect. As a result, in Examples 1, 3 and 4 the resin flow prevention effect was excellent, as shown in Table 6 described later, and no fiber fluffing due to resin shortage was seen on the surface layers of fiber-reinforced composite panels that were manufactured using the resin compositions of these Examples. On the other hand, in Comparative Examples 1 and 2 the resin flow prevention effect was insufficient, as shown in Table 6 described later, and fiber fluffing due to resin shortage was seen on the surface layers of fiber-reinforced composite panels that were manufactured using the resin compositions of these Comparative Examples.

From the above results, it was confirmed that the results based on the above evaluation criteria will be the same as the results that were obtained in the actual prepreg molding.

5. Confirmation of Drapability and Tackyness of Prepregs

The drapability and tackyness of prepregs that were manufactured using the resin compositions in Examples were evaluated based on the following criteria.
[Evaluation Criteria]

○○: The viscosity of the resin composition at 30° C. is measurable, and the viscosity at 30° C. is 18000 Pa·s or more, and the drapability and tackyness of a prepreg that was manufactured using this resin composition can be judged to be excellent.

○: The viscosity of the resin composition at 30° C. is so high that the viscosity cannot be measured at 30° C., and the viscosity at 45° C. is 5000 Pa·s or more and less than 100000 Pa·s, and the drapability and tackyness of a prepreg that was manufactured using this resin composition can be judged to be good.

Δ: The viscosity of the resin composition at 30° C. is so high that the viscosity cannot be measured at 30° C., and the viscosity at 45° C. is less than 5000 Pa·s or 100000 Pa·s or more, or the viscosity of the resin composition at 30° C. is 5000 Pa·s or more and less than 18000 Pa·s, and a prepreg that was manufactured using this resin composition can be judged to be usable.

x: The viscosity of the resin composition at 30° C. and 45° C. is so high that the viscosity cannot be measured at these temperatures, or the viscosity of the resin composition at 30° C. is less than 5000 Pa·s, and a prepreg that was manufactured using this resin composition can be judged to be unusable.

[Environment for the Confirmation]
Temperature: 23° C.
Humidity: 50% RH.

For Examples 1, 3 and 4 and Comparative Examples 1 and 2, which were judged as "◯◯" based on the above evaluation criteria, the drapability and tackyness of the prepregs that were manufactured using the resin compositions of these Examples were actually confirmed by touching the prepregs. As a result, the prepregs of these examples had excellent drapability and tackyness, and it was confirmed that these results are the same as the results that were obtained based on the above evaluation criteria.

TABLE 1

|  | Example | | | | | | |
|---|---|---|---|---|---|---|---|
|  | 1 | 2 | 3 | 4 | 5 | 6 | 7 |
| <Component (a1)> | | | | | | | |
| BMI-2300 | 63 | 63 | 63 | 63 | 63 | 63 | — |
| BMI-80 | — | — | — | — | — | — | — |
| <Component (a2)> | | | | | | | |
| BMI-TMH | 37 | 37 | 37 | 37 | 37 | 37 | — |
| <Eutectic mixture of component (a1) and component (a2)> | | | | | | | |
| Compimid353 | — | — | — | — | — | — | 100 |
| <Component (b)> | | | | | | | |
| BPA-CA | 40 | 40 | 40 | 40 | 80 | 80 | 80 |
| <Component (c)> | | | | | | | |
| DAISO ISO DAP | 30 | 30 | 30 | 60 | 30 | 60 | 30 |
| <Component (d)> | | | | | | | |
| PERCUMYL D | 0.3 | 0.1 | — | 0.3 | 0.3 | 0.3 | 0.3 |
| 1. Bending test | | | | | | | |
| Strength (MPa) | 158 | 156 | 173 | 146 | 188 | 179 | 180 |
| Elastic modulus (GPa) | 4.05 | 3.99 | 3.89 | 3.64 | 3.96 | 4.31 | 4.35 |
| Breaking elongation (%) | 4.27 | 4.36 | 5.27 | 4.33 | 5.97 | 4.67 | 4.60 |
| 2. DMA measurement | | | | | | | |
| G'-Tg (° C.) | 289 | 285 | 290 | no data | 301 | 284 | 284 |
| tanδmax (° C.) | 350 or more | 345 | 344 | no data | 400 or more | 400 or more | 400 or more |
| 3. Viscosity measurement | | | | | | | |
| Viscosity at 30° C. (Pa·s) | 77394 | 77942 | 121912 | 143743 | 20593 | 44864 | 85271 |
| Viscosity at 45° C. (Pa·s) | 2433 | 3343 | 3268 | 8972 | 716 | 1523 | 1709 |
| Viscosity at 60° C. (Pa·s) | 168 | 200 | 209 | 780 | 58 | 127 | 100 |
| Lowest viscosity (Pa·s) | 0.17 | 0.15 | 0.10 | 0.45 | 0.11 | 0.20 | 0.12 |
| Temperature at lowest viscosity (° C.) | 150 | 159 | 179 | 149 | 151 | 152 | 152 |
| 4. Resin flow prevention | ◯ | ◯ | ◯ | ◯ | ◯ | ◯ | ◯ |
| 5. Drapability and tackyness of prepreg | ◯◯ | ◯◯ | ◯◯ | ◯◯ | ◯◯ | ◯◯ | ◯◯ |

|  | Example | | | | | |
|---|---|---|---|---|---|---|
|  | 8 | 9 | 10 | 11 | 12 | 13 |
| <Component (a1)> | | | | | | |
| BMI-2300 | 48 | 58 | 58 | 80 | 60 | 85 |
| BMI-80 | 15 | — | — | — | — | — |
| <Component (a2)> | | | | | | |
| BMI-TMH | 37 | 42 | 42 | 20 | 40 | 15 |
| <Eutectic mixture of component (a1) and component (a2)> | | | | | | |
| Compimid353 | — | — | — | — | — | — |
| <Component (b)> | | | | | | |
| BPA-CA | 40 | 80 | 40 | 80 | 25 | 50 |
| <Component (c)> | | | | | | |
| DAISO ISO DAP | 30 | 60 | 60 | 60 | 30 | 30 |
| <Component (d)> | | | | | | |
| PERCUMYL D | — | — | — | — | — | — |

TABLE 1-continued

| 1. Bending test | | | | | | |
|---|---|---|---|---|---|---|
| Strength (MPa) | no data | no data | no data | no data | no data | no data |
| Elastic modulus (GPa) | no data | no data | no data | no data | no data | no data |
| Breaking elongation (%) | no data | no data | no data | no data | no data | no data |
| 2. DMA measurement | | | | | | |
| G'-Tg (° C.) | 279 | 274 | 284 | 283 | 293 | 286 |
| tanδmax (° C.) | 319 | 391 | 341 | 305 | 401 | 328 |
| 3. Viscosity measurement | | | | | | |
| Viscosity at 30° C. (Pa · s) | 144086 | 53699 | 149084 | 88305 | 99642 | 100985 |
| Viscosity at 45° C. (Pa · s) | 4073 | 2702 | 8573 | 34980 | 4279 | 23931 |
| Viscosity at 60° C. (Pa · s) | 238 | 218 | 675 | 1792 | 274 | 738 |
| Lowest viscosity (Pa · s) | 0.09 | 0.15 | 0.32 | 0.60 | 0.11 | 0.16 |
| Temperature at lowest viscosity (° C.) | 179 | 174 | 167 | 160 | 176 | 170 |
| 4. Resin flow prevention | ○ | ○ | ○ | ○ | ○ | ○ |
| 5. Drapability and tackyness of prepreg | ○○ | ○○ | ○○ | ○○ | ○○ | ○○ |

TABLE 2

| | Example | | | | | | |
|---|---|---|---|---|---|---|---|
| | 14 | 15 | 16 | 17 | 18 | 19 | 20 |
| <Component (a1)> | | | | | | | |
| BMI-2300 | 75 | 70 | 90 | 100 | 90 | 55 | 55 |
| <Component (a2)> | | | | | | | |
| BMI-TMH | 25 | 30 | 10 | — | 10 | 45 | 45 |
| <Component (b)> | | | | | | | |
| BPA-CA | 25 | 60 | 120 | 100 | 120 | 25 | 40 |
| <Component (c)> | | | | | | | |
| DAISO ISO DAP | 30 | 60 | 30 | 30 | 60 | 30 | 30 |
| 1. Bending test | | | | | | | |
| Strength (MPa) | no data | no data | no data | no data | no data | no data | no data |
| Elastic modulus (GPa) | no data | no data | no data | no data | no data | no data | no data |
| Breaking elongation (%) | no data | no data | no data | no data | no data | no data | no data |
| 2. DMA measurement | | | | | | | |
| G'-Tg (° C.) | 295 | 274 | 278 | 293 | 291 | 283 | 283 |
| tanδmax (° C.) | 400 or more | 303 | 322 | 325 | 331 | 400 or more | 332 |
| 3. Viscosity measurement | | | | | | | |
| Viscosity at 30° C. (Pa · s) | 101363 | 97345 | 77301 | 145801 | 76996 | 96773 | 102719 |
| Viscosity at 45° C. (Pa · s) | 44974 | 7139 | 1865 | 9498 | 3188 | 2997 | 1481 |
| Viscosity at 60° C. (Pa · s) | 1549 | 453 | 106 | 401 | 229 | 228 | 109 |
| Lowest viscosity (Pa · s) | 0.21 | 0.24 | 0.09 | 0.18 | 0.14 | 0.10 | 0.08 |
| Temperature at lowest viscosity (° C.) | 171 | 166 | 168 | 160 | 177 | 180 | 183 |
| 4. Resin flow prevention | ○ | ○ | ○ | ○ | ○ | ○ | ○ |
| 5. Drapability and tackyness of prepreg | ○○ | ○○ | ○○ | ○○ | ○○ | ○○ | ○○ |

| | Example | | | | | |
|---|---|---|---|---|---|---|
| | 21 | 22 | 23 | 24 | 25 | 26 |
| <Component (a1)> | | | | | | |
| BMI-2300 | 100 | 75 | 70 | 70 | 80 | 58 |
| <Component (a2)> | | | | | | |
| BMI-TMH | — | 25 | 30 | 30 | 20 | 42 |
| <Component (b)> | | | | | | |
| BPA-CA | 100 | 25 | 40 | 40 | 40 | 25 |

TABLE 2-continued

| <Component (c)> | | | | | | |
|---|---|---|---|---|---|---|
| DAISO ISO DAP | 60 | 60 | 20 | 45 | 60 | 60 |
| 1. Bending test | | | | | | |
| Strength (MPa) | no data | no data | no data | no data | no data | no data |
| Elastic modulus (GPa) | no data | no data | no data | no data | no data | no data |
| Breaking elongation (%) | no data | no data | no data | no data | no data | no data |
| 2. DMA measurement | | | | | | |
| G'-Tg (° C.) | 286 | 302 | 292 | 289 | 287 | 296 |
| tanδmax (° C.) | 320 | 400 or more | 354 | 342 | 312 | 400 or more |
| 3. Viscosity measurement | | | | | | |
| Viscosity at 30° C. (Pa · s) | 147162 | Impossible to measure | 147340 | Impossible to measure | Impossible to measure | 103301 |
| Viscosity at 45° C. (Pa · s) | 15300 | 87484 | 5325 | 19913 | 53369 | 9004 |
| Viscosity at 60° C. (Pa · s) | 641 | 4454 | 302 | 996 | 2989 | 669 |
| Lowest viscosity (Pa · s) | 0.36 | 0.60 | 0.08 | 0.20 | 0.56 | 0.29 |
| Temperature at lowest viscosity (° C.) | 152 | 163 | 173 | 175 | 168 | 175 |
| 4. Resin flow prevention | ○ | ○ | ○ | ○ | ○ | ○ |
| 5. Drapability and tackyness of prepreg | ○○ | ○ | ○○ | ○ | ○ | ○○ |

TABLE 3

| | Example | | | | | | |
|---|---|---|---|---|---|---|---|
| | 27 | 28 | 29 | 30 | 31 | 32 | 33 |
| <Component (a1)> | | | | | | | |
| BMI-2300 | 63 | 40 | 60 | 60 | 85 | 80 | 80 |
| <Component (a2)> | | | | | | | |
| BMI-TMH | 37 | 60 | 40 | 40 | 15 | 20 | 20 |
| <Component (b)> | | | | | | | |
| BPA-CA | 40 | 70 | 15 | 110 | 25 | 120 | 120 |
| <Component (c)> | | | | | | | |
| DAISO ISO DAP | 100 | 70 | 65 | 55 | 30 | 30 | 60 |
| <Component (d)> | | | | | | | |
| PERCUMYL D | 0.3 | — | — | — | — | — | — |
| 1. Bending test | | | | | | | |
| Strength (MPa) | 149 | no data | no data | no data | no data | no data | no data |
| Elastic modulus (GPa) | 3.60 | no data | no data | no data | no data | no data | no data |
| Breaking elongation (%) | 4.39 | no data | no data | no data | no data | no data | no data |
| 2. DMA measuerment | | | | | | | |
| G'-Tg (° C.) | 301 | 288 | no data | 258 | 299 | 278 | 281 |
| tanδmax (° C.) | 192 | 201 | no data | 284 | 391 | 350 or more | 300 or more |
| 3. Viscosity measurement | | | | | | | |
| Viscosity at 30° C. (Pa · s) | 123317 | 101705 | Impossible to measure | 10066 | Impossible to measure | 16968 | 32829 |
| Viscosity at 45° C. (Pa · s) | 32860 | 4198 | 43939 | 651 | 104919 | 518 | 1256 |
| Viscosity at 60° C. (Pa · s) | 3442 | 351 | 5068 | 66 | 6751 | 40 | 97 |
| Lowest viscosity (Pa · s) | 1.63 | 0.32 | 0.79 | 0.09 | 0.34 | 0.05 | 0.10 |
| Temperature at lowest viscosity (° C.) | 145 | 179 | 161 | 179 | 172 | 185 | 174 |
| 4. Resin flow prevention | ○ | ○ | ○ | ○ | ○ | Δ | ○ |
| 5. Drapability and tackyness of prepreg | ○○ | ○○ | ○ | Δ | Δ | Δ | ○○ |

TABLE 3-continued

| | Example | | | | | |
|---|---|---|---|---|---|---|
| | 34 | 35 | 36 | 37 | 38 | 39 |
| <Component (a1)> | | | | | | |
| BMI-2300 | 40 | 40 | 55 | 85 | 100 | 40 |
| <Component (a2)> | | | | | | |
| BMI-TMH | 60 | 60 | 45 | 15 | — | 60 |
| <Component (b)> | | | | | | |
| BPA-CA | 25 | 50 | 80 | 20 | 80 | 50 |
| <Component (c)> | | | | | | |
| DAISO ISO DAP | 30 | 30 | 30 | 60 | 60 | 60 |
| <Component (d)> | | | | | | |
| PERCUMYL D | — | — | — | — | — | — |
| 1. Bending test | | | | | | |
| Strength (MPa) | no data | no data | no data | no data | no data | no data |
| Elastic modulus (GPa) | no data | no data | no data | no data | no data | no data |
| Breaking elongation (%) | no data | no data | no data | no data | no data | no data |
| 2. DMA measuerment | | | | | | |
| G'-Tg (° C.) | 296 | 278 | 266 | no data | no data | 273 |
| tanδmax (° C.) | 400 or more | 400 or more | 288 | no data | no data | 298 |
| 3. Viscosity measurement | | | | | | |
| Viscosity at 30° C. (Pa · s) | 11612 | 10805 | 11300 | Impossible to measure | Impossible to measure | 11728 |
| Viscosity at 45° C. (Pa · s) | 649 | 294 | 452 | 125918 | 43900 | 882 |
| Viscosity at 60° C. (Pa · s) | 63 | 34 | 40 | 44861 | 1627 | 93 |
| Lowest viscosity (Pa · s) | 0.07 | 0.05 | 0.05 | 2.40 | 0.80 | 0.12 |
| Temperature at lowest viscosity (° C.) | 187 | 184 | 176 | 147 | 145 | 183 |
| 4. Resin flow prevention | Δ | Δ | Δ | ○ | ○ | ○ |
| 5. Drapability and tackyness of prepreg | Δ | Δ | Δ | Δ | ○ | Δ |

TABLE 4

| | Comparative Example | | | | | | | |
|---|---|---|---|---|---|---|---|---|
| | 1 | 2 | 3 | 4 | 5 | 6 | 7 | 8 |
| <Component (a1)> | | | | | | | | |
| BMI-2300 | 63 | 63 | — | 100 | 70 | 85 | 60 | 35 |
| <Component (a2)> | | | | | | | | |
| BMI-TMH | 37 | 37 | — | — | 30 | 15 | 40 | 65 |
| <Eutectic mixture of component (a1) and component (a2)> | | | | | | | | |
| Compimid353 | — | — | 100 | — | — | — | — | — |
| <Component (b)> | | | | | | | | |
| BPA-CA | 40 | 40 | 80 | 25.5 | — | — | — | — |
| Matrimide5292B | — | — | — | — | 38.3 | 50 | 25 | 25 |
| <Component (c)> | | | | | | | | |
| DAISO ISO DAP | — | — | — | — | — | — | — | — |
| <Component (d)> | | | | | | | | |
| PERCUMYL D | — | 0.3 | — | — | — | — | — | — |

TABLE 4-continued

|  | Comparative Example | | | | | | | |
|---|---|---|---|---|---|---|---|---|
|  | 1 | 2 | 3 | 4 | 5 | 6 | 7 | 8 |
| <Other Components> | | | | | | | | |
| DAISO ISO DAP 100 Monomer | — | — | — | 10.2 | — | — | — | — |
| 1. Bending test | | | | | | | | |
| Strength (MPa) | 162 | no data | 177 | 178 | 181 | 216 | 169 | 141 |
| Elastic modulus (GPa) | 3.83 | no data | 4.13 | 4.45 | 3.85 | 4.05 | 3.96 | 3.73 |
| Breaking elongation (%) | 5.19 | no data | 5.08 | 4.68 | 6.06 | 7.52 | 5.06 | 4.81 |
| 2. DMA measurement | | | | | | | | |
| G'-Tg (° C.) | 289 | no data | 269 | no data | 276 | 287 | 272 | 272 |
| tanδmax (° C.) | 362 | no data | 400 | no data | 374 | 362 | 400 or more | 400 or more |
| 3. Viscosity measurement | | | | | | | | |
| Viscosity at 30° C. (Pa · s) | 44430 | 28454 | 31760 | Impossible to measure | 105100 | 32373 | 27204 | 904 |
| Viscosity at 45° C. (Pa · s) | 683 | 623 | 705 | Impossible to measure | 2523 | 806 | 763 | 62 |
| Viscosity at 60° C. (Pa · s) | 41 | 38 | 41 | 1099 | 89 | 160 | 48 | 12 |
| Lowest viscosity (Pa · s) | 0.03 | 0.04 | 0.03 | 0.07 | 0.03 | 0.04 | 0.03 | 0.02 |
| Temperature at lowest viscosity (° C.) | 175 | 154 | 178 | 168 | 175 | 169 | 188 | 177 |
| 4. Resin flow prevention | X | X | X | Δ | X | X | X | X |
| 5. Drapability and tackyness of prepreg | ○○ | ○○ | ○○ | X | ○○ | ○○ | ○○ | X |

TABLE 5

|  | Comparative Example | | | | | | | |
|---|---|---|---|---|---|---|---|---|
|  | 9 | 10 | 11 | 12 | 13 | 14 | 15 | 16 |
| <Component (a1)> | | | | | | | | |
| BMI-2300 | 45 | 35 | 70 | 70 | 50 | 60 | 85 | 50 |
| BMI-H | — | — | — | — | — | — | — | — |
| <Component (a2)> | | | | | | | | |
| BMI-TMH | 55 | 65 | 30 | 30 | 50 | 40 | 15 | 50 |
| <Component (b)> | | | | | | | | |
| BPA-CA | — | — | 50 | 38.3 | 60 | — | — | — |
| Matrimide5292B | 25 | 40 | — | — | — | 10 | 60 | 45 |
| <Component (c)> | | | | | | | | |
| DAISO ISO DAP | — | — | — | — | — | — | — | — |
| <Component (d)> | | | | | | | | |
| PERCUMYL D | — | — | — | 0.2 | — | — | — | — |
| 1. Bending test | | | | | | | | |
| Strength (MPa) | 155 | 172 | 203 | 190 | 197 | no data | 204 | 178 |
| Elastic modulus (GPa) | 3.98 | 3.88 | 4.03 | 4.02 | 4.02 | no data | 4.20 | 3.88 |
| Breaking elongation (%) | 4.70 | 6.28 | 7.22 | 5.91 | 8.01 | no data | 6.63 | 6.58 |
| 2. DMA measurement | | | | | | | | |
| G'-Tg (° C.) | 270 | 277 | 283 | 268 | 277 | 421 | 283 | 282 |
| tanδmax (° C.) | 400 or more | 327 | 314 | 383 | 297 | 418 | 305 | 328 |
| 3. Viscosity measurement | | | | | | | | |
| Viscosity at 30° C. (Pa · s) | 2920 | 510 | 51874 | 98372 | 1851 | Impossible to measure | Impossible to measure | 3086 |
| Viscosity at 45° C. (Pa · s) | 133 | 43 | 1447 | 1227 | 153 | 3405 | 14438 | 179 |

TABLE 5-continued

|  | Comparative Example | | | | | | | |
|---|---|---|---|---|---|---|---|---|
|  | 9 | 10 | 11 | 12 | 13 | 14 | 15 | 16 |
| Viscosity at 60° C. (Pa · s) | 5 | 12 | 55 | 64 | 68 | 173 | 67 | 16 |
| Lowest viscosity (Pa · s) | 0.02 | 0.01 | 0.03 | 0.04 | 0.01 | 0.03 | 0.04 | 0.03 |
| Temperature at lowest viscosity (° C.) | 174 | 168 | 174 | 155 | 185 | 186 | 172 | 172 |
| 4. Resin flow prevention | X | X | X | X | X | X | X | X |
| 5. Drapability and tackyness of prepreg | X | X | ○○ | ○○ | X | Δ | ○ | X |

In Examples 1, 3 and 4 and Comparative Examples 1 and 2, in addition to the above measurement, the resin flow rate was measured to determine the physical properties of the prepreg during prepreg molding, and DMA was measured to determine the physical properties of the fiber-reinforced composite materials. The conditions of DMA measurement for the fiber-reinforced composite materials were same as that of the DMA measurement for the cured resin plates described above. In addition, regarding Example 1, 0° and 90° bending tests were also performed for physical properties of fiber-reinforced composite material. The evaluation results are shown in Table 6.

≤Measurement of Resin Flow Rate During Molding>

The percent by mass of the resin that flowed, based on the resin that was contained in the laminated prepreg (stack), was regarded as "the resin flow rate." The resin flow rate was calculated from the mass of the stack, the mass of the fiber-reinforced composite material after curing, and the total mass of the resin in the stack according to formula (11).

{The resin flow rate}={The total mass of the resin in the stack}/{(The mass of the stack before curing)−(The mass of the stack after curing)}×100    (11).

The resin flow during molding differs greatly depending on the size and shape of the stack, the curing temperature, the lamination configuration, and the way in which a bagging operation is carried out. For example, the resin flow, when prepregs are laminated in one direction, is larger than the resin flow when prepregs are laminated in various directions. In order to clarify the effects of the present invention, the resin flow rate was measured under the following conditions:

[Measurement Conditions]
Stack size: 200 mm×200 mm
Lamination configuration: 14 sheets are laminated in one direction
Curing method: autoclave molding method
Curing conditions: temperature is increased at 1.7° C./min from room temperature (23° C.) up to 180° C. and then held at 180° C. for 6 hours.

Figure 2:
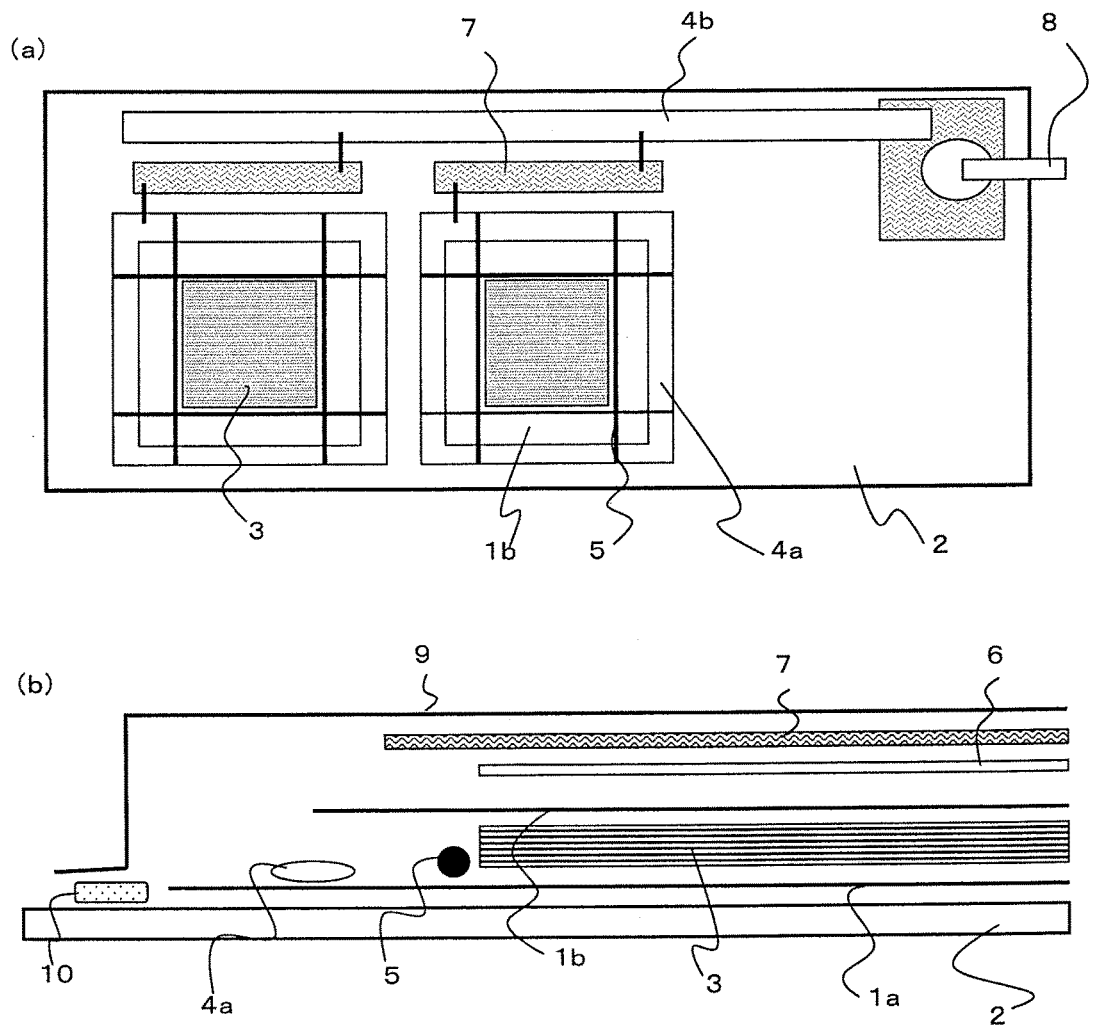
FIG. 2 shows conceptual diagrams showing one example of a bagging configuration for prepreg molding, and (a) is a top view and (b) is a side view.

Bagging Procedure (A Conceptual Diagram of a Bagging Configuration is Shown in FIG. 2.)

[Procedure 1.] A laminated prepreg (i.e. stack) 3 was placed on a base plate 2 on which release film 1a was laid.
[Procedure 2.] A glass sleeve 4a was placed around stack 3. On that occasion, a space of about 25 mm was left between the ends of stack 3 and glass sleeve 4a.
[Procedure 3.] Glass yarns 5 were placed along the ends of stack 3, and both ends of the glass yarns were fixed to glass sleeve 4a with heat-resistant tape (not shown).
[Procedure 4.] A release film 1b was laid on the upper surface of the stack. The size of the release film was adjusted such that half the glass sleeve 4a was covered with the film. Further, a pressure plate 6 was put.
[Procedure 5.] During curing, pressure is applied within an autoclave, and pressure is reduced within a bag. Therefore, the resin flows in the direction for suction opening 8 from stack 3. A nonwoven fabric (nylon nonwoven fabric) 7 was intentionally placed in this path along which the resin flows, so that the resin accumulated there. Specifically, glass sleeve 4b was placed in contact with suction opening 8, and nonwoven fabric 7 was placed between this glass sleeve 4b and glass sleeve 4a that was placed around the stack. These glass sleeves and the nonwoven fabric were connected by using glass yarns. The nonwoven fabric had a size that was sufficient to enable resin to accumulate there.
[Procedure 6.] Bag film 9 was laid over, and its ends were sealed with sealant 10.

≤0° Bending Test of Fiber-Reinforced Composite Material>

The 0° bending test of the fiber-reinforced composite material (i.e. specimen) was performed. In the test, no film was laid under the loading nose.
Apparatus: Instron model 4465 (manufactured by Instron Corporation)
Crosshead speed: 0.01×(span$^2$)/6/specimen thickness
Span/thickness ratio: 40
Sample size: 127 mm long, 12.7 mm wide, and 2 mm thick
[Measurement Environment]
Temperature: 23° C.
Humidity: 50% RH.

≤90° Bending Test of Fiber-Reinforced Composite Material>

The 90° bending test of the fiber-reinforced composite material was performed.
Apparatus: Instron model 4465 (manufactured by Instron Corporation)
Crosshead speed: 0.01×(span)/6/specimen thickness
Span/thickness ratio: 16
Sample size: 60 mm long, 12.7 mm wide, and 2 mm thick
[Measurement Environment]
Temperature: 23° C.
Humidity: 50% RH.

TABLE 6

|  | Example 1 | Example 3 | Example 4 | Comparative Example 1 | Comparative Example 2 |
|---|---|---|---|---|---|
| <Component (a)> | | | | | |
| BMI-2300 | 63 | 63 | 63 | 63 | 63 |
| BMI-TMH | 37 | 37 | 37 | 37 | 37 |
| <Component (b)> | | | | | |
| BPA-CA | 40 | 40 | 40 | 40 | 40 |
| <Component (c)> | | | | | |
| DAISO ISO DAP | 30 | 30 | 60 | — | — |
| <Component (d)> | | | | | |
| PERCUMYL D | 0.3 | — | 0.3 | — | 0.3 |
| Physical property of a prepreg during prepreg molding | | | | | |
| Resin flow rate (% by mass) | 14.6 | 15.6 | 11.5 | 36.2 | 23.8 |
| Physical properties of fiber-reinforced composite material | | | | | |
| 0° Bending test | | | | | |
| Strength (MPa) | 2104 | no data | no data | no data | no data |
| Elastic modulus (GPa) | 137 | no data | no data | no data | no data |
| Breaking elongation (%) | 1.6 | no data | no data | no data | no data |
| 90° Bending test | | | | | |
| Strength (MPa) | 128 | no data | no data | no data | no data |
| Elastic modulus (GPa) | 8.26 | no data | no data | no data | no data |
| Breaking elongation (%) | 1.5 | no data | no data | no data | no data |
| DMA measurement | | | | | |
| G'-Tg (° C.) | 281 | 282 | 281 | 282 | 287 |
| tanδmax (° C.) | 350 or more | 331 | 350 or more | 346 | 358 |

By determining the composition of the raw materials according to claims, resin compositions that have high heat resistance and excellent handleability, prepregs that have excellent tackyness and drapability and that cause little resin flow during molding, and fiber-reinforced composite materials that have high heat resistance were easily obtained.

Figure 3:
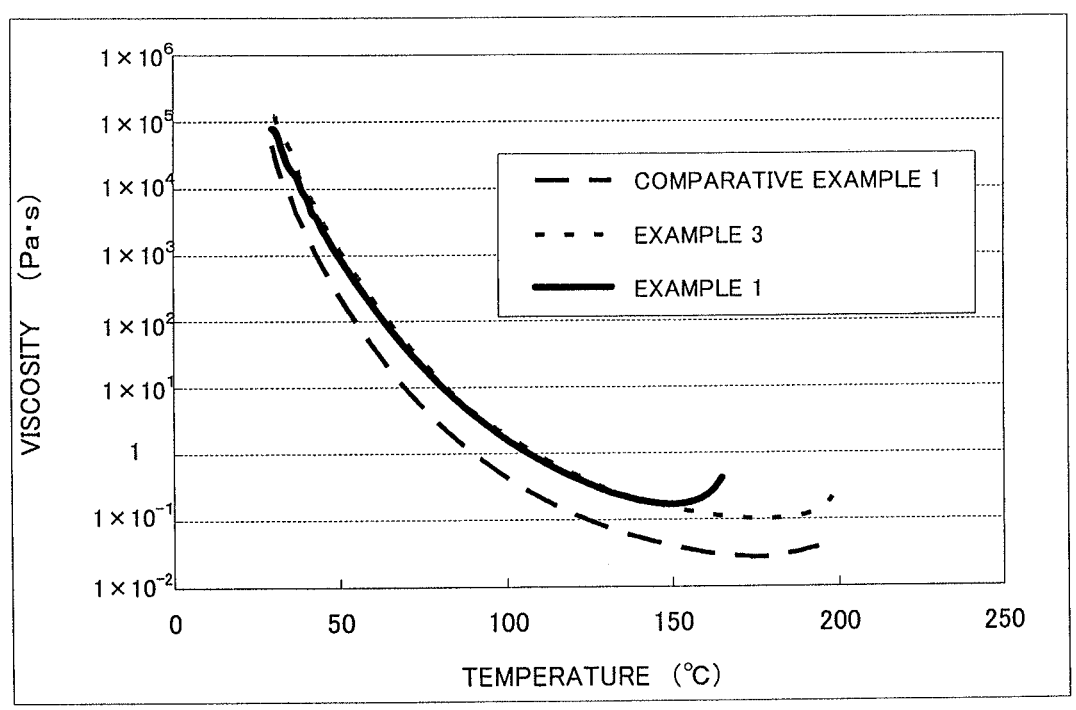
FIG. 3 is a graph that shows measurement results of viscosity as the temperature increases for each case of Examples 1 and 3 and Comparative Example 1.

The measurement results of viscosity as the temperature increases for Examples 1 and 3 and Comparative Example 1 are shown in FIG. 3. As for Example 3, in which component (c) was further added to the resin composition in Comparative Example 1, the lowest viscosity value increased compared with that of Comparative Example 1, but viscosity value at around 30° C. was substantially unchanged. Example 1 relates to a resin composition in which component (d) is further blended into the resin composition in Example 3. It is shown that the curing reaction was accelerated by adding component (d). In addition, the handleability and physical properties of the resin compositions were not impaired by adding component (c) and/or component (d). From the viscosity measurement results, it can be assumed that the resin flow prevention effect is obtained by blending component (c) and/or component (d).

As shown in Table 6, in Comparative Example 1, 36.2% by mass of the resin composition that was contained in the stack, flowed out during molding. In Examples 1, 3 and 4 in which component (c) or components (c) and (d) were blended, the resin flow rate was reduced to half or less compared to that of Comparative Example 1. On the other hand, in the case of Comparative Example 2 in which component (c) was not blended and in which only component (d) was blended, the resin flow rate was 23.8% by mass, and the resin flow was reduced to only about ⅔ of that of Comparative Example 1. A more effective method to prevent the flow of resin was to increase the viscosity of the resin composition than to increase the rate of the curing reaction. In addition, even when the prepreg of Example 3 was actually molded and cured without a bagging which prevents resin flow during curing, a good fiber reinforced composite panel was obtained without any shortage of resin, and it was judged that the flow of resin was sufficiently prevented. On the other hand, when molding and curing were similarly performed using the prepreg of Comparative Example 2, places where the reinforcing fibers were fluffy due to resin shortage were recognized in the obtained fiber reinforced composite panel, and it was judged that resin flow could not be adequately prevented. A bagging operation which prevents resin flow refers to a bagging configuration in which the periphery of a prepreg laminate is covered with an auxilliary material without an opening in the periphery so that the resin does not flow out from the laminate during curing.

Based on the measurement results of viscosity as the temperature increases and based on the measurement results of the resin flow rate, a determination can be made in which the lowest viscosity of a resin composition and the temperature at which the viscosity is lowest, in particular, the lowest viscosity, can be effective indicators for measuring the resin flow prevention effect. In order to obtain a resin composition of which a resin flow is prevented when a prepreg is molded and which has good handleability, the lowest viscosity of the resin composition is preferably in the range of 0.08 Pa·s or more and 3.00 Pa·s or less.

<Stability Evaluation of a Resin Composition>

Measurement of viscosity at a constant temperature, and measurement of viscosity as the temperature increases after exposure in a room temperature environment were carried out as regards the resin composition that was obtained in Example 1 under the conditions shown below, and the stability of the resin composition was evaluated.

Measurement of Viscosity of Resin Composition at a Constant Temperature
[Measurement Conditions]
Apparatus: the trade name AR-G2 (manufactured by TA Instruments)
Plate used: a 35 mm φ parallel plate
Plate gap: 0.5 mm
Measurement frequency: 10 rad/sec
Stress: 300 N/m² (3000 dynes/cm²)
Measurement temperature: 70° C.
Measurement time: 3 hours.

Measurement of Viscosity of Resin Compositions as Temperature Increase
[Measurement Conditions]
Apparatus: the trade name AR-G2 (manufactured by TA Instruments)
Plate used: a 35 mm φ parallel plate
Plate gap: 0.5 mm
Measurement frequency: 10 rad/sec
Stress: 300 N/m² (3000 dynes/cm²)
Rate of temperature rise: 2° C./min
Exposure period: two months
[Exposure Environment]
Temperature: 23° C.
Humidity: 50% RH.

As a result of the measurement no large difference was observed among the viscosity of the resin composition immediately after it was obtained in Example 1, the viscosity of the resin composition that had been continuously heated at 70° C. for 3 hours, and the viscosity of the resin composition that had been continuously exposed in a room temperature environment for two months, which indicates that the resin composition had good stability.

INDUSTRIAL APPLICABILITY

A resin composition that provides good heat resistance and handleability and that produces a prepreg which has a good balance between tackyness and drapability and which causes little resin flow during prepreg molding can be used for manufacturing a prepreg and a fiber-reinforced composite material. In addition, this fiber-reinforced composite material can be preferably used in aerospace applications, industrial applications and the like where high heat resistance is required.

REFERENCE SIGNS LIST 1a, 1b release film
2 base plate
3 stack (prepreg)
4a, 4b glass sleeve
5 glass yarn
6 pressure plate
7 nylon nonwoven fabric
8 suction opening
9 bag film
10 sealant

The invention claimed is:
1. A resin composition comprising
an aromatic maleimide compound,
an aliphatic maleimide compound,
diallyl bisphenol A and
a diallyl isophthalate polymer,
wherein the resin composition is a blend in which the following formulas are satisfied when amounts of the aromatic maleimide compound, the aliphatic maleimide compound, the diallyl bisphenol A and the diallyl isophthalate polymer are represented by [a1], [a2], [b] and [c], respectively, in parts by mass:

$$[a1]+[a2]=100 \tag{1}$$

$$[b] \geq 20 \tag{2}$$

$$[b] \leq -1.4 \times [a2]+140 \tag{3}$$

$$[b] \geq -3.6 \times [a2]+90 \tag{4}$$

$$15 \leq [c] \leq 65 \tag{5}$$

$$0 \leq [a2] \leq 45 \tag{6}$$

2. A resin composition comprising
an aromatic maleimide compound,
an aliphatic maleimide compound,
diallyl bisphenol A and
a diallyl isophthalate polymer,
wherein the resin composition is a blend in which the following formulas are satisfied when the amounts of the aromatic maleimide compound, the aliphatic maleimide compound, the diallyl bisphenol A and the diallyl isophthalate polymer are represented by [a1], [a2], [b] and [c], respectively, in parts by mass:

$$[a1]+[a2]=100 \tag{7}$$

$$40 \leq [b] \leq 80 \tag{8}$$

$$15 \leq [a2] \leq 40 \tag{9}$$

$$20 \leq [c] \leq 60 \tag{10}$$

3. The resin composition according to claim 1 or 2, wherein a weight average molecular weight of the diallyl isophthalate polymer is 30000 or more and 50000 or less in terms of standard polystyrene equivalent.

4. A prepreg obtained by impregnating reinforcing fibers with a resin composition according to claim 1 or 2.

5. The prepreg according to claim 4, wherein the reinforcing fibers are carbon fibers.

6. A fiber-reinforced composite material obtained by molding a prepreg according to claim 4.

7. The resin composition according to claim 1, wherein the aromatic maleimide compound is a mixture of aromatic maleimide compounds represented by the following formula I:

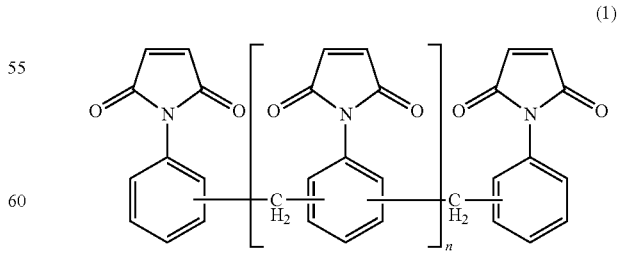

(1)

wherein "n" in formula I is 0.3 to 0.4 on average.

8. The resin composition according to claim 1, wherein the aliphatic maleimide compound is a polyfunctional maleimide compound that has two or more maleimide compounds in which a main chain that links the maleimide compounds is mainly composed of hydrocarbon.

9. The resin composition according to claim 1, wherein the aromatic maleimide compound is selected from the group consisting of N,N'-m-phenylenedimaleimide, N,N'-p-phenylenedimaleimide, 4,4'-bismaleimidodiphenylether, bisphenol A diphenyl ether bismaleimide, 3,3'-dimethyl-5,5'-diethyl-4,4'-bismaleimidodiphenylmethane, 4-methyl-1,3-phenylenedimaleimide, 2,2-bis-[4-(4-maleimidophenoxy)phenyl]propane, N,N'-2,4-tolylenedimaleimide and N,N'-2,6-tolylenedimaleimide.

10. The resin composition according to claim 1, wherein the aliphatic maleimide compound is 1,6-dimaleimido-(2,2,4-trimethyl)hexane.

11. The resin composition according to claim 1 or 2, wherein the composition further comprises a peroxide.

12. The resin composition according to claim 2, wherein the aromatic maleimide compound is selected from the group consisting of N,N'-m-phenylenedimaleimide, N,N'-p-phenylenedimaleimide, 4,4'-bismaleimidodiphenylether, bisphenol A diphenyl ether bismaleimide, 3,3'-dimethyl-5,5'-diethyl-4,4'-bismaleimidodiphenylmethane, 4-methyl-1,3-phenylenedimaleimide, 2,2-bis-[4-(4-maleimidophenoxy)phenyl]propane, N,N'-2,4-tolylenedimaleimide and N,N'-2,6-tolylenedimaleimide.

13. The resin composition according to claim 2, wherein the aliphatic maleimide compound is 1,6-dimaleimido-(2,2,4-trimethyl)hexane.

\* \* \* \* \*